United States Patent [19]

Sylvén

[11] 4,451,060
[45] May 29, 1984

[54] DEVICE FOR VEHICLE SAFETY BELTS

[75] Inventor: Hans Sylvén, Vårgårda, Sweden

[73] Assignee: AB Stil-Industri, Vargarda, Sweden

[21] Appl. No.: 348,487

[22] PCT Filed: Jun. 17, 1981

[86] PCT No.: PCT/SE81/00181
§ 371 Date: Feb. 12, 1982
§ 102(e) Date: Feb. 12, 1982

[87] PCT Pub. No.: WO81/03619
PCT Pub. Date: Dec. 24, 1981

[30] Foreign Application Priority Data

Jun. 18, 1980 [SE] Sweden .................. 8004512

[51] Int. Cl.³ .............................................. B60R 21/10
[52] U.S. Cl. ................................ 280/801; 280/804; 297/468
[58] Field of Search ..................... 280/801, 802, 804; 297/468, 469, 473

[56] References Cited

U.S. PATENT DOCUMENTS

| | | | |
|---|---|---|---|
| 2,804,313 | 8/1957 | Gilles | 297/473 |
| 3,833,239 | 9/1974 | Coenen | 280/804 |
| 4,056,271 | 11/1977 | Imabuchi | 280/804 |
| 4,169,615 | 10/1979 | Wize | 280/801 |
| 4,256,330 | 3/1981 | Geoffrey | 280/802 |
| 4,317,584 | 3/1982 | Takata | 280/804 |

*Primary Examiner*—Bruce H. Stoner, Jr.
*Assistant Examiner*—John A. Carroll

[57] ABSTRACT

A vehicle safety belt of the roller-type with a belt having one end connected to a lower mounting point constructed as an extended bracket allowing for movement of that end of the belt and with a stop arranged to halt the pulling-in of the belt after the belt is disconnected in such a position that that end of the belt is released from the pull-in force of the reeling device to permit moving the belt aside by gravity or manually.

5 Claims, 5 Drawing Figures

DEVICE FOR VEHICLE SAFETY BELTS

BACKGROUND OF THE INVENTION

For certain vehicle types, such as vehicles where access to a rear seat is through a front door, a conflict develops between the requirement of a correct force geometry for the safety belt in the operating position and the desire for the belt to be completely able to be moved aside to allow access to the rear seat. Previously, attempts were made to solve this problem by anchoring the belt strap in a pivoted arm able to be reset between a forward and a backward folded position. However, certain difficulties have been associated with the resetting of the arm, e.g. when parking on steep inclines. The introduction of a pivoted arm also meant problems of absorbing loads in the pivot axle, as lateral forces are produced during high belt loads.

By means of a device shown in the Swedish Patent Application No. 7709451-4 attempts have been made to solve the earlier problems referred to above. This solution is based on the fact that the lower mounting point on the door side is constructed as an extended bar along which one end of the belt strap is movable. The resetting of the belt strap from the operating position to the moved aside position is done by means of the pull-in force of the reeling device, this force being based on a certain geometry in such a way that the belt strap pull-in force forms a component force striving to move the end of the belt strap along the rod to a moved aside position. However, it has been shown that, after a period of use, this component force will not be sufficient to return the belt strap due to the rod friction, e.g. by dirt accumulation on the rod.

SUMMARY OF THE INVENTION

The purpose of the present invention is to arrive at a device by means of which the problems indicated above are avoided.

This purpose is achieved by means of a device in accordance with the present invention.

In accordance with the invention, there is provided a vehicle comprising, in combination:
(1) a body;
(2) a seat in the body to carry a person; and
(3) a safety belt for the person occupying the seat, comprising
   (a) a belt strap;
   (b) an upper belt strap mounting in the body adjacent an upper part of the seat at one side thereof and forming a guide bracket through which the belt strap slides;
   (c) a reeling device mounted to said body and connected to one end of the belt strap for pulling the belt strap through the guide bracket into the reeling device;
   (d) a lower belt strap mounting in the body adjacent a lower part of the seat at said one side thereof and forming an elongated bracket extending lengthwise in the travel direction of the vehicle;
   (e) an eye formed by the other end of the belt strap slidably embracing and anchored to the elongated bracket;
   (f) a connecting device located at the other side of the seat for releasably anchoring a part of the belt strap extending between the lower and upper mountings; and
   (g) a stop on the belt strap for engagement with the upper mounting and thus limiting wind up of the belt strap on the reel when the belt strap is pulled into the reeling device and located at a spacing from said other end of the belt strap in excess of the spacing between the upper mounting and the elongated bracket; the eye of the belt strap being slidable along the elongated bracket between a first position when the belt strap is anchored to the connecting device; and a second position when the belt strap is released from the connecting device and pulled into the reeling device; the spacing of the first and second positions along the elongated bracket being sufficient to enable the belt strap to be moved aside by sliding the eye along the bracket and thereby facilitate movement of a person into and out from the seat.

BRIEF DESCRIPTION OF THE DRAWINGS

The invention will be described below, with references made to the appended drawings of which.

DETAILED DESCRIPTION OF THE DRAWINGS

Figure 1:
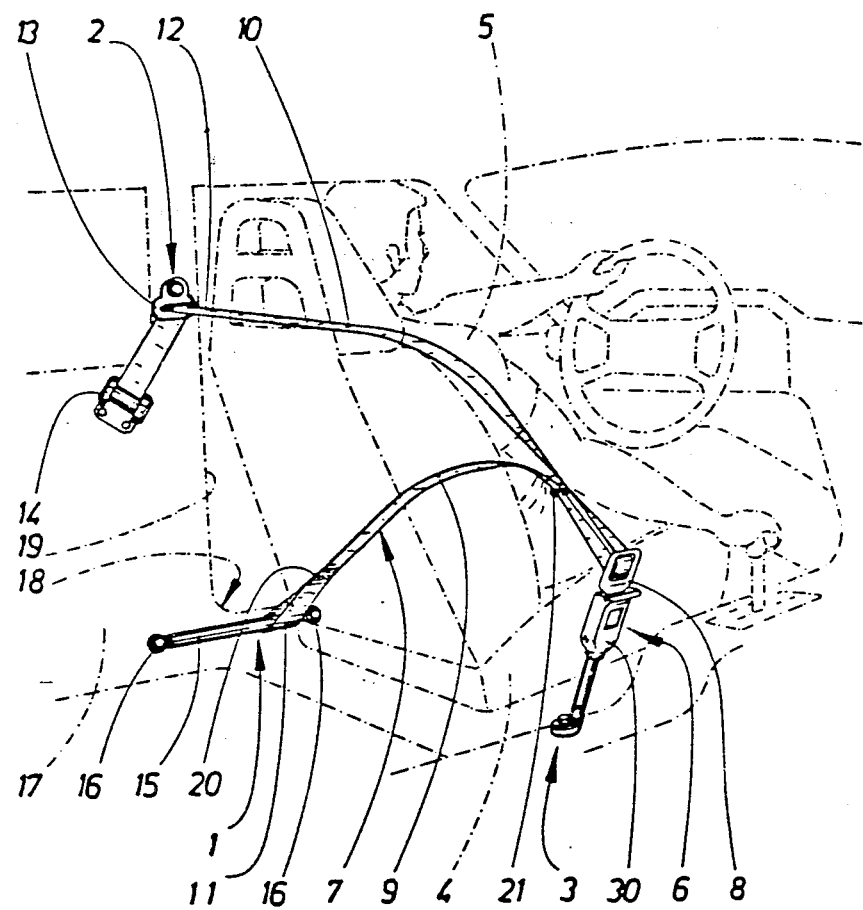
FIG. 1 shows a safety belt according to the invention in the operating position.
Figure 2:
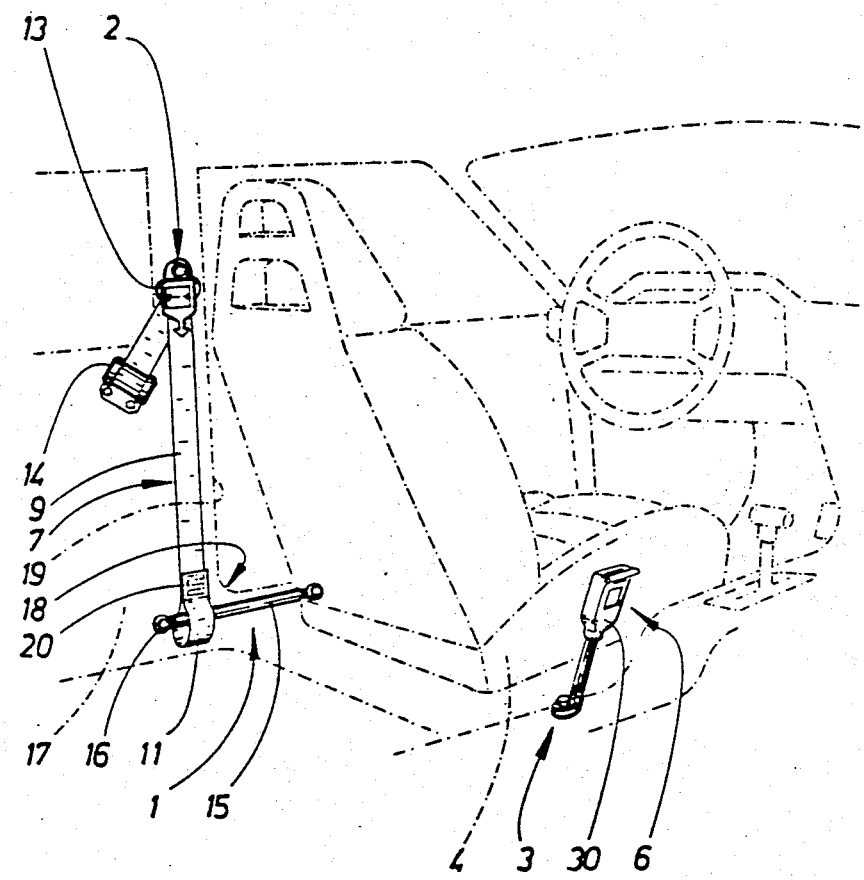
FIG. 2 shows the safety belt in the moved aside position.

A safety belt according to the invention, therefore, is intended for vehicles where access to the rear seat is through the front door openings. FIGS. 1 and 2 show by means of dot and dash lines the interior of such a vehicle while the safety belt is shown drawn in unbroken lines. This safety belt is a so called three-point belt having two mounting positions on the door side of the vehicle, i.e. a lower mounting point 1 and an upper mounting point 2 as well as a third mounting point 3 low down on the opposite side of vehicle seat 4 designed to support the wearer of the belt 5. At the third mounting point the belt is anchored by means of a device 6, divided into a gripping and locking first connection component 30 and a second connecting component 8 locking into the component mentioned. Between mounting points 1 and 2 and the connecting device 6 runs a belt strap 7 divided into a hip strap 9 and a chest strap 10. The hip strap 9 stretches from the lower mounting point 1 on the door side and the connecting device 6, while the chest strap runs from an upper mounting point 2 and the connecting device 6. Both the hip strap 9 and the chest strap 10 are fixed to the second connecting part 8 which, therefore, is detachable from the connecting part 30 and, it follows, from the mounting point 3. This is the functional run of the belt strap 7 while, in practice, it is constructed as a single, integral strap to be redirected in a way known as such at the connecting part 8 consisting of a so called locking tongue. The belt strap 7 has a lower end 11 by means of which the belt is anchored to the mounting point 1 and an upper end 12 by means of which it is anchored to the mounting point 2. The upper mounting point 2 in the example shown consists of a guide buckle 13 where the belt strap is redirected to run to a reeling device 14. The expression "belt strap end" thus means functionally that part of the belt strap utilized on each occasion, and to be found at the guide buckle. The reeling device 14 is thus arranged to pull in and to release, respectively, the belt strap in order to adapt it to the size of the wearer and the position of the vehicle seat 4 and in order to allow resetting of the safety belt between the moved aside position and the operating position. The reeling device 14 has a detent mechanism known as such which is arranged under certain circumstances to arrest the belt strap 7 in order to prevent its unrolling, e.g. at abnormal vehicle velocity variations and excessive strap acceleration, i.e. too great an acceleration in the unrolling movement of the reeling device.

Figures 4, 5:
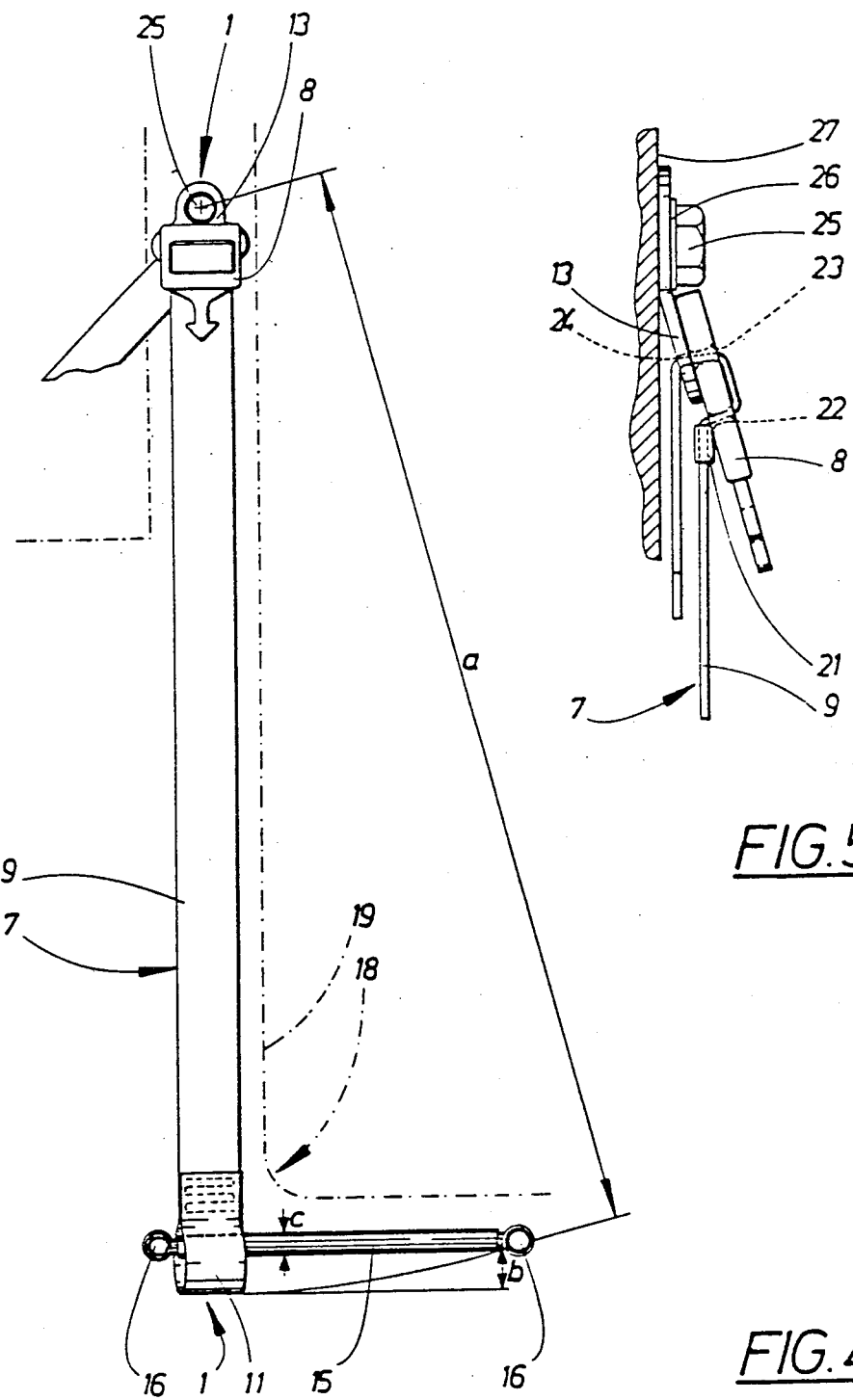
FIG. 4 shows a corresponding view of part of the safety belt in the moved aside position.
FIG. 5 shows in an enlarged scale and from the side part of the safety belt at its upper mounting point.

The lower mounting point for belt strap 7 consists of an extended bracket 15 positioned basically in the longitudinal vehicle direction and consisting of a rod, a plastic covered length of wire rope or similar anchored at both ends to the inside of the vehicle side panel 17 by means of two screws 16 or similar in such a way that the bracket 15 runs at a distance from this inside panel allowing a space to be formed between bracket 15 and the panel. In addition, the bracket is positioned below the vehicle door opening 18, partially extending in front of the rear edge 19 of the door opening and partially behind the rear edge 19. At the front end of the bracket 15 an end stop is formed, for instance, by the screw 16 or by a sleeve surrounding the lower end 11 of the belt strap 7. This end is designed to move along bracket 15 between a forward end position shown in FIG. 1 and forming the belt operating position and a rear end position being the moved aside position of the safety belt and shown in FIGS. 2 and 4. In the example shown the lower strap end 11 is constructed as an eye fitted round bracket 15 and formed by sewing together by means of seams 20 parts of the belt straps positioned against one another. The eye may be reinforced.

In the operating position of the safety belt, with the lower end 11 of the safety belt in its forward position, the safety belt displays its correct geometry, with the lower mounting point correctly positioned from the point of view of load, i.e. in order to produce a correct force geometry to retain the wearer of the belt 5 securely and with minimum injuries at abnormal vehicle velocities, such as in a collision.

In order to facilitate access to the rear seat of the vehicle through the door opening 18 the safety belt is able to be moved aside to a stored position taken up in conditions of release, i.e. when the safety belt is not used. The belt strap 7 is then pulled in as far as possible by means of the reeling device 14 so that basically the hip strap part 9 of the belt runs along the inside of the vehicle from the upper mounting point 2 to the lower mounting point 1, or more exactly, basically straight down along, and in the example shown slightly inside, the rear edge 19 of the door opening 18. This is made possible by the fact that the lower end 11 of the belt strap 7 is arranged to be movable along the bracket 15 to a rear position shown in FIGS. 2 and 4.

This is achieved according to the invention by the safety belt having a stop 21 arranged to discontinue the pulling in of the safety belt by means of the reeling device 14 in such a position that, after releasing the locking tongue 8 from the connecting component 30 and pulling in the locking tongue towards the upper mounting point 2, i.e. the guide buckle 13, the pull-in force applied to the belt strap by the reeling device will no longer affect the belt strap 7 at the lower mounting point 1. In the example shown the stop 21 consists of a thickened member fixed to the belt strap 7 in an accurately determined position and adjusted so as not to be able to pass through the locking tongue 8 and, hence, not through the guide buckle 13. This can best be seen from FIG. 5. The stop may, for instance, consist of a plastic member stretching across the strap and having a thickness exceeding the thickness of one of the slots 22 in the locking tongue 8. In the example shown the belt strap is redirected in the locking tongue by two slots 22 and 23 and in the guide buckle by a slot 24, the belt strap being arranged to run comparatively freely through all three slots while being pulled in by the reeling device 14, the locking tongue being brought along to the position shown in FIG. 5 after which the belt strap continues to run through the slots until its stop 21 contacts the locking tongue which is held against the guide buckle 13 by the pull-in force of the belt strap. By means of a screw 25 and washer 26 the guide buckle 13 is anchored to the inside of the vehicle side panel 27. By means of a suitably adjusted clearance the guide buckle 13 will obtain a pivoted bearing in relation to the screw 25 enabling the guide buckle to adopt a position adjusted to the direction of the belt strap.

Figure 3:
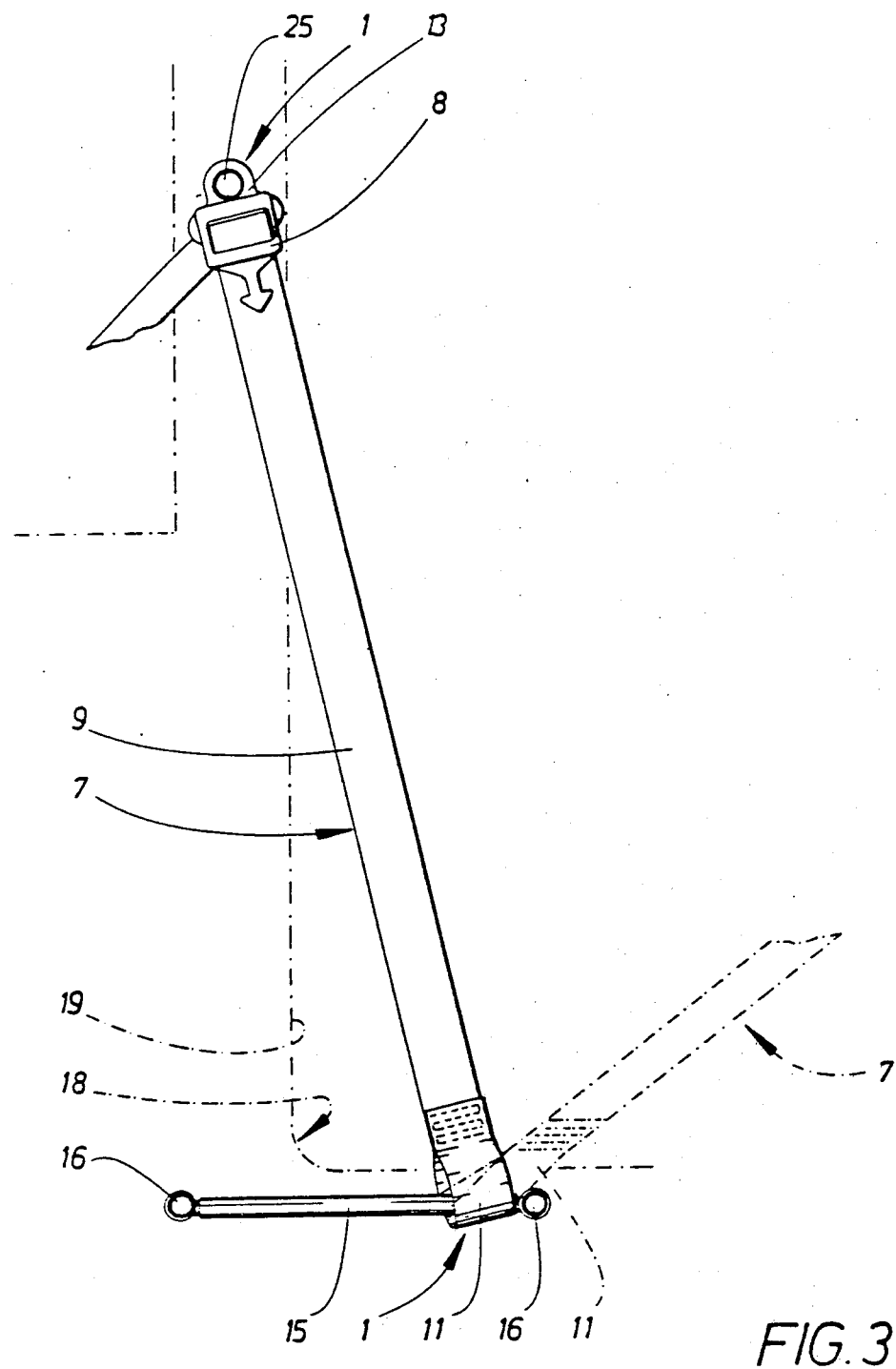
FIG. 3 shows in an enlarged scale part of the safety belt in the operating position as well as in an intermediate position following the disconnection of the safety belt.

FIG. 3 shows the belt strap 7 drawn in dot and dash lines in the operating position, the lower end 11 of the belt strap being held at the front end of the bracket. When the wearer of the belt releases the locking tongue 8 from the connecting component 30 the belt strap 7 will be pulled in by means of the reeling device as described above, the lower end 11 of the belt strap initially remaining at the front end of the bracket 15, i.e. in the position drawn in unbroken lines in FIG. 3, and the pulling in movement continues until the stop 21 discontinues it by contacting the locking tongue 8 at the guide buckle 13. This position is so adjusted that the hip strap part 9 just becomes stretched in the position shown causing the lower end of the belt strap to become released from the pull-in force of the reeling device 14. Thus, this pull-in force is not applied to the bracket 15 in the unlocked position of the belt strap and the inside of the eye of the belt strap at most being in slight contact with the bracket 15. This allows the lower end 11 of the belt strap to fall from its sloping position shown in FIG. 3 to the position shown in FIG. 4 through the gravitational force. This is made possible because the eye 11 is at such a height that the bracket 15 will not come into appreciable contact with the inside of the upper part of the eye. During the resetting movement of the belt strap 7 in the intermediate position shown in FIG. 3 immediately after the stop contacting the upper mounting point 1 the strap will execute a pivoting movement, with the mounting screw 25 of the guide buckle 13 as the pivot axle. The stop is then so positioned that the pulling in movement is discontinued before or at the latest when the reeling device tries to pull in the strap to a distance shorter than the distance 'a' between the pivot axle mentioned and the inner surface of the eye. Thus, in the example shown the distance from the stop 21 to the surface of the eye active during load absorption should equal or exceed the distance from the stop to the surface of the bracket 15 active for load absorption in the operating position. The height of the eye must be not less than the sum of the thickness of the bracket 15 and the level reduction 'b' to which the inside of the forward pointing edge of the eye may be exposed. This presupposes that the bracket 15 runs basically horizontally. When entering in other vehicle positions the belt strap may easily be moved aside manually.

Locking the safety belt in the operating position is done in the conventional manner by gripping the locking tongue 8 with the hand and bringing it together with the other connecting component 30 causing both components to lock together. As the distance 'a' created in the moved aside position is normally less than the length of the hip strap 9 required a movement of the lower end 11 of the belt strap along the bracket 15 to the operating position takes place automatically, the required strap length being made to run through the slots 22 and 23 in the locking tongue. The lower strap end 11, therefore, is held in the operating position by the effect of the pull-in force of the reeling device 14 in normal use while, under conditions of abnormal velocity variations, the detent device in the reeling device is activated and the wearer of the belt restrained due to the fact that the load acting on the belt strap is absorbed at all three mounting points 1, 2 and 3 as well as in the reeling device.

The basic principle of the present invention is that the resetting of the safety belt to the moved aside position is made possible by the discontinuation at a preset point of the reeling action by means of a stop so that the lower end 11 of the belt strap is released from the pull-in force and thus allowed to pivot to a moved aside position by the effect of some other force, such as the force of gravitation. It is also essential that the lower strap end 11 is designed to allow this movement without hindrance.

VARIATIONS OF THE INVENTION

The invention is not limited to the embodiments described above and shown in the drawings but may be varied in a number of ways within the scope of the claims. For instance, the stop may be arranged differently. It may consist of a member stopping the pulling in movement by contact against the reeling device 14. The reeling device itself may then be fitted with a member stopping the reeling action at a predetermined point. It is also possible for the return of the belt strap to the moved aside position to be effected by means of some auxiliary power in the form of spring power, e.g. a helical spring, rubber band, elastic or similar. It is also possible for the lower end of the belt strap to be constructed as a runner bearing movably on the bracket 15, the runner, for instance, being constructed with a weight and the bracket 15 being mounted sloping to enable the weight to move along the bracket under the effect of the force of gravitation.

I claim:

1. A vehicle comprising, in combination:
(1) a body;
(2) a seat in the body to carry a person; and
(3) a safety belt for the person occupying the seat, comprising
  (a) a belt strap;
  (b) an upper belt strap mounting in the body adjacent an upper part of the seat at one side thereof and forming a guide bracket through which the belt strap slides;
  (c) a reeling device mounted to said body and connected to one end of the belt strap for pulling the belt strap through the guide bracket into the reeling device;
  (d) a lower belt strap mounting in the body adjacent a lower part of the seat at said one side thereof and forming an elongated bracket extending lengthwise in the travel direction of the vehicle;
  (e) an eye formed by the other end of the belt strap slidably embracing and anchored to the elongated bracket;
  (f) a connecting device located at the other side of the seat for releasably anchoring a part of the belt strap extending between the lower and upper mountings; and
  (g) a stop on the belt strap for engagement with the upper mounting and thus limiting wind up of the belt strap on the reel when the belt strap is pulled into the reeling device and located at a spacing from said other end of the belt strap in excess of the spacing between the upper mounting and the elongated bracket;

the eye of the belt strap being slidable along the elongated bracket between a first position when the belt strap is anchored to the connecting device; and a second position when the belt strap is released from the connecting device and pulled into the reeling device; the spacing of the first and second positions along the elongated bracket being sufficient to enable the belt strap to be moved aside by sliding the eye along the bracket and thereby facilitate movement of a person into and out from the seat.

2. A device according to claim 1 in which the eye end of the belt strap is so dimensioned as to describe an arc when the belt strap is slid from the first position to the second position along the elongated bracket.

3. A device according to claim 2 in which the height of the eye is at least equal to the sum of the level variation in relation to the elongated bracket to which the eye is subjected during sliding movement of the belt strap and the thickness of the elongated bracket.

4. A device according to claim 3 in which the stop is so positioned and arranged on the belt strap as to arrest pulling of the belt strap upon contact against the upper belt strap mounting.

5. A device according to claim 4 in which the stop is so positioned that in the contact position, the spacing from the stop to the eye at least equals the spacing from the stop to the elongated bracket.

* * * * *